(12) United States Patent
Trumper

(10) Patent No.: US 7,093,666 B2
(45) Date of Patent: Aug. 22, 2006

(54) APPARATUS AND METHOD FOR PROVIDING FIREPROOFING TO AN AIRCRAFT AUXILIARY POWER UNIT

(75) Inventor: Ronald Francis Trumper, St. Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 105 days.

(21) Appl. No.: 10/370,803

(22) Filed: Feb. 20, 2003

(65) Prior Publication Data
US 2004/0194975 A1    Oct. 7, 2004

(51) Int. Cl.
*A62C 3/07* (2006.01)
(52) U.S. Cl. .............. 169/62; 169/48; 169/49; 169/54; 244/121; 244/129.2; 60/39.091; 60/39.11
(58) Field of Classification Search ............ 169/45, 169/48, 49, 54, 62; 244/58, 53 R, 121, 129.2; 60/39.08, 39.11, 796, 39.091
See application file for complete search history.

(56) References Cited

U.S. PATENT DOCUMENTS

| | | |
|---|---|---|
| 2,952,125 A | 9/1960 | Brunton |
| 4,418,879 A | 12/1983 | Vanderleest |
| 4,441,314 A | 4/1984 | Fitton |
| 4,706,908 A | 11/1987 | Huffman et al. |
| 5,239,817 A | 8/1993 | Mildenstein et al. |
| 5,284,012 A * | 2/1994 | Laborie et al. ............ 60/39.08 |
| 5,397,080 A | 3/1995 | Berg |
| 5,501,284 A | 3/1996 | Clodfelter et al. |
| 5,524,846 A | 6/1996 | Shine et al. |
| 5,655,359 A | 8/1997 | Campbell et al. |
| 6,264,137 B1 | 7/2001 | Sheoran |
| 6,272,838 B1 | 8/2001 | Harvell et al. |
| 6,342,004 B1 | 1/2002 | Lattimore et al. |

FOREIGN PATENT DOCUMENTS

| | | |
|---|---|---|
| EP | 0 514 119 | 11/1992 |
| EP | 1 130 335 | 9/2001 |
| JP | 1 222 139 | 9/1989 |

* cited by examiner

*Primary Examiner*—Steven J. Ganey
(74) *Attorney, Agent, or Firm*—Ogilvy Renault LLP

(57) ABSTRACT

A fire protection apparatus for an oil cooler in an aircraft auxiliary power unit compartment adapted to at least partially cover the oil cooler to thereby at least partially block flames from directly impinging the oil cooler in the event of a fire in the compartment. An associated means and method are also disclosed.

19 Claims, 2 Drawing Sheets

APPARATUS AND METHOD FOR PROVIDING FIREPROOFING TO AN AIRCRAFT AUXILIARY POWER UNIT

FIELD OF THE INVENTION

This invention relates generally cooling a gas turbine engine mounted in a compartment, and more particularly to apparatus and method for improving fire protection in such devices.

BACKGROUND

Auxiliary power unit nacelle compartments must be carefully ventilated to avoid "dead air" zones where flammable gases may undesirably collect and thus pose a potential fire threat. The compartment, however, despite the best efforts of designers does inevitably have zones where the ventilation is less than ideal, and thus fireproofing measures are not only desirable, but government regulations also require certain levels of fireproofing be present. Thus, for example, when a fire is detected in the compartment, typically a fire-suppressing liquid (such as halene) is dispensed into the compartment to control the flames. Fire resistant materials are also used in construction. For example, oil coolers in such systems are often constructed of stainless steel or the like, to provide fire protection should a fire occur in the compartment while the auxiliary power unit is in operation. The stainless steel provides better heat resistance (relative to generally preferred lighter-weight materials like aluminium, etc.) to the oil in the cooler in the presence of the high temperatures of a nearby fire. Such measures add weight to the overall design, however, and thus it would be desirable to provide improved, lighter weight measures for providing fire protection.

SUMMARY OF THE INVENTION

It is an object of this invention to provide an improved fire protection apparatus and method to an auxiliary power unit installation in an aircraft.

In a first aspect, the present invention provides a fire protection apparatus for an oil cooler in an aircraft auxiliary power unit compartment, the oil cooler mounted to an exhaust eductor on an auxiliary power unit in the compartment, the oil cooler having a first side substantially facing the compartment and a second side mounted to the exhaust eductor, the fire protection apparatus comprising a fire shield mounted adjacent the oil cooler, the fire shield adapted to at least partially cover the oil cooler to thereby at least partially block flames from directly impinging the oil cooler in the event of a fire in the compartment.

In a second aspect, the present invention provides a fire protection apparatus for an oil cooler in an aircraft auxiliary power unit compartment, the fire protection apparatus comprising shield means for blocking impingement of flames of a fire on the oil cooler. In a third aspect, the present invention provides a method of providing fire protection to an oil cooler mounted in an auxiliary power unit the compartment, the method comprising the steps of sensing a fire in the compartment and at least partially covering the oil cooler when a fire is sensed in the compartment to at least partially block flames from directly impinging on the oil cooler.

DETAILED DESCRIPTION OF THE PREFERRED EMBODIMENTS

Figure 1:
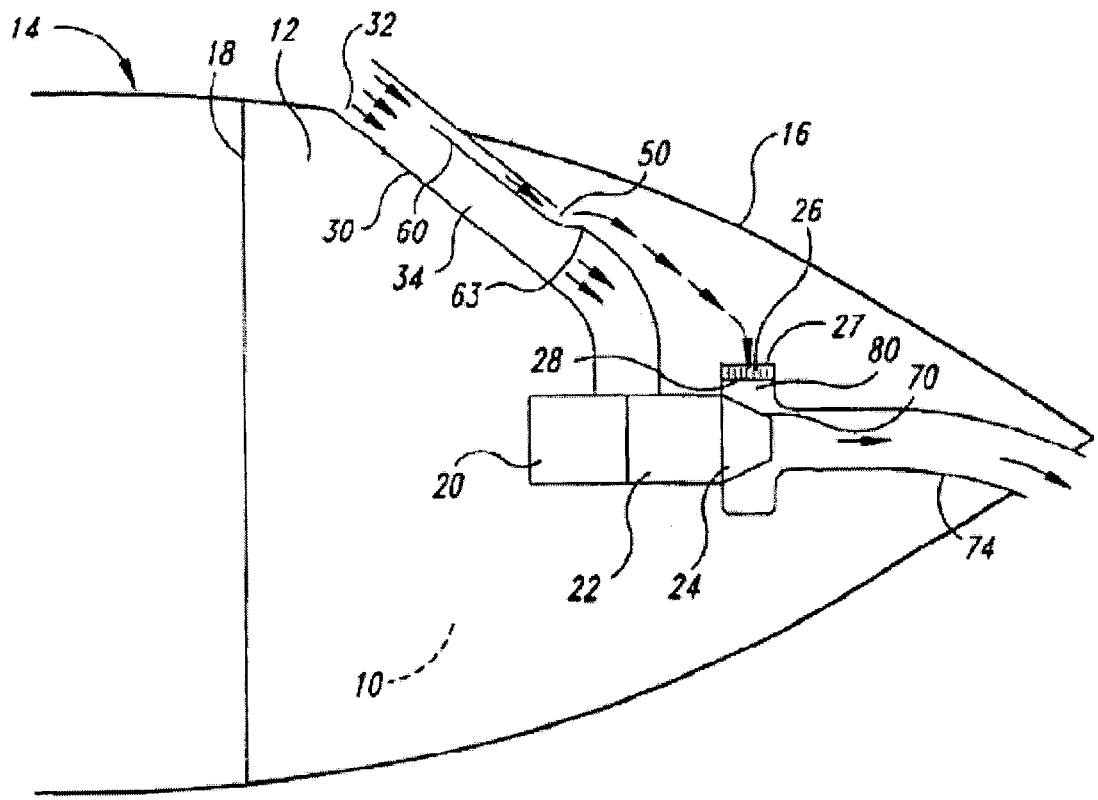
FIG. 1 is a schematic view of a typical passive cooling system for an auxiliary power unit according to the prior art.

FIG. 1 schematically illustrates a prior art passive cooling system for an auxiliary power unit 10. Auxiliary power unit 10 is positioned in a compartment 12, which is located in the aft fuselage of an aircraft 14 having an exterior surface 16. Compartment 12 is separated from the rest of the fuselage by a firewall 18, and exterior surfaces 16 of aircraft 14 form the remaining walls of compartment 12. Auxiliary power unit 10 typically includes a load compressor 20, a power compressor 22 and a turbine 24. An oil cooler 26 is provided to cool oil (not shown) used by auxiliary power unit 10, as will be described further below.

An intake duct 30 extends between an intake opening 32 in exterior surface 16 and auxiliary power unit 10. Intake duct 30 defines an airflow passage 34 through which auxiliary power unit 10 draws combustion air. Intake opening 32 permits air to flow in the direction of the arrows under the influence of auxiliary power unit 10 itself (ground operation) or the air stream of the aircraft and the auxiliary power unit (flight operation). Intake duct 30 also includes an inlet scoop 60 mounted therein to divert a portion of the air flowing through airflow passage 34 into compartment 12 via a compartment outlet 50. Auxiliary power unit 10 also has an exhaust exit 70 positioned in an exhaust passage 74 leading to the exterior of aircraft 14. An eductor 80 is positioned between exit 70 and oil cooler 26.

When auxiliary power unit 10 is in operation, high-speed exhaust exiting at 70 creates a low-pressure region in eductor 80. The low-pressure region in eductor 80 causes air to be drawn from compartment 12 and through oil cooler 26, entering a compartment side 27 of the oil cooler 26 and then exiting from an eductor side 28 into eductor 80. The cooling air is then mixed with the exhaust from auxiliary power unit 10 and expelled into the ambient environment. Oil passing through the oil cooler 26 is thus cooled by the air flow and kept within a desired operating temperature range.

To protect against the unlikely event of a fire breaking out in compartment 12, all system components are provided with fire protection to prevent damage to the components, and to ensure a level of safety is maintained for the aircraft payload, ground service personnel, and the like. Since air is drawn from the compartment 12 into heat exchanger 26, heat exchanger 26 must also be provided with fireproofing, and is thus typically stainless steel (or similar high-heat resistant material) to provide the desired level of fire protection. The additional weight added by the stainless steel components can be significant, however, relative to lighter-weight but less fire resistant materials such as aluminum which are typically preferred in non-fire-critical areas in aircraft construction). Therefore if aluminum is to be used, for example, it would be desirable to provide alternate fireproofing means for air cooler 26.

Figure 2:
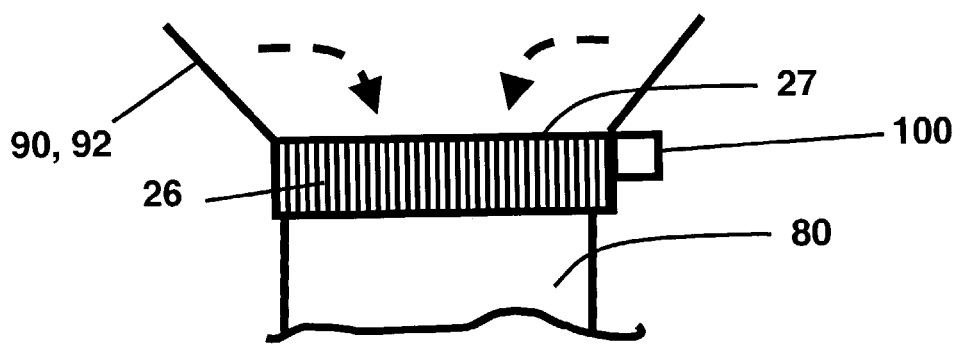
FIG. 2 is an enlarged portion of the general system of FIG. 1, and incorporating a first embodiment of an apparatus according to the present invention.

Referring to FIG. 2, according to a first aspect of the present invention, a fire shield 90 is provided for selectively covering the heat exchanger in the event of a fire. An actuator member 100 is also provided to preferably automatically close fire shield 90 as soon as a fire is sensed in the compartment by an appropriate sensor(s) (not shown). The heat exchanger is preferably also clad with a fireproof material and insulation, as required. The oil cooler, thus protected in the event of a fire, may now be made of any material suitable for an oil cooler, such as aluminum.

In the embodiment of FIG. 2, fire shield 90 includes "cabinet" type doors 92 which are actively closed by an actuator 100 which is hydraulically actuated. The doors 92 are preferably steel doors of a sufficient thickness so as to be fireproof (e.g. 0.005" thick or thicker is preferred, though any fireproof configuration will suffice). Two doors 92 are shown, but any number (including one) may be provided to substantially shield the cooler from a fire in the compartment. When closed, door(s) 92 protect the heat exchanger 26 from a compartment fire, and thereby allow the heat exchanger to be made of less fire-resistant material such as aluminum, which is of course beneficially lightweight. The weight savings on an typical commercial airliner auxiliary power unit installation could be upwards of 60 pounds, depending on the design and configuration. The benefit is therefore significant.

Fire shield 90 may also provide protection in a negative pressure scenario (air flowing backward through eductor into compartment) if the air cooler is sufficiently sealed by fire shield 90. A further benefit is that, by cutting the airflow through the eductor in the event of a fire, door(s) 92 assist in dousing the fire in the compartment by impeding a diluting air flow into the compartment and thereby enhancing the concentration of halene (or other fire suppressant) in the compartment.

Fire shield 90 may have any suitable configuration which sufficiently blocks or otherwise shields the impingement of the flames of a compartment fire on exposed non-fireproof parts of the cooler 26. Fire shield 90 may be mounted to oil cooler 26, eductor 80 or another structure in compartment 12. Preferably fire shield 90 protects the entirety of air cooler 26, but it need not, depending on the particular circumstances of application. Fire shield 90 may also form part of a larger fire control apparatus provided for oil cooler 26 of the auxiliary power unit installation.

Figure 3:
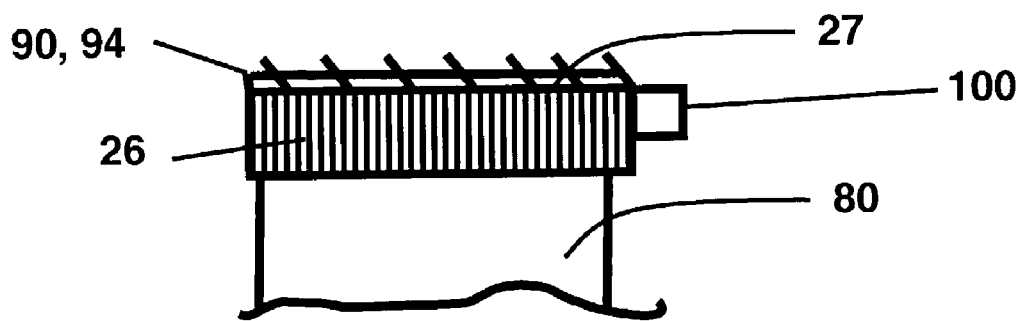
FIG. 3 is an enlarged portion of the system of FIG. 1, and incorporating a second embodiment of an apparatus according to the present invention.

Referring to FIG. 3, in a second embodiment fire shield 90 includes a plurality or louvres 94 or blinds 94 mounted above oil cooler 26. Blinds 94 are preferably actively closable by actuator member 100 in the event of a fire. Alternately, if properly placed and configured (as will be appreciated by one skilled in the art in light of this disclosure), louvres 94 may be unmovable or fixed, i.e. do not require to be closed in the event of a fire to provide adequate shielding to the oil cooler 94. Rather, the lover slats are angled to provide shielding from direct impingement for flames from a compartment fire and yet still provide air access to the oil cooler in normal operation by way of a "tortuous" or other non-direct air path into the cooler 26.

Figure 4:
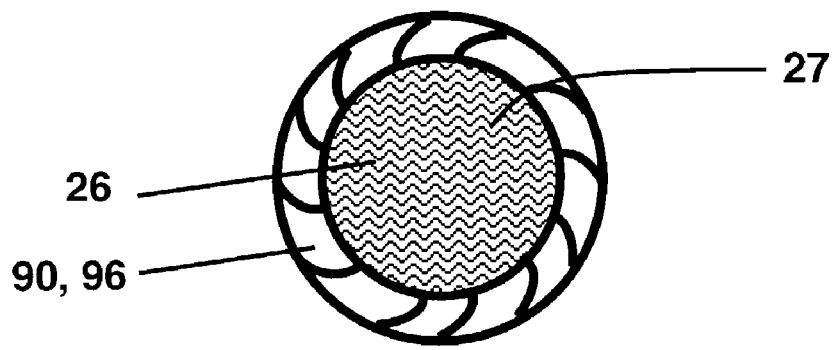
FIG. 4 is an enlarged portion of the system of FIG. 1 (looking down on the air cooler), and incorporating a third embodiment of an apparatus according to the present invention.

Referring to FIG. 4, in a third embodiment fire shield 90 includes an iris-like enclosure (shown only partially closed in FIG. 4) which may be closed over oil cooler 26 in the event of a compartment fire to shield the cooler from the flames.

Figure 5:
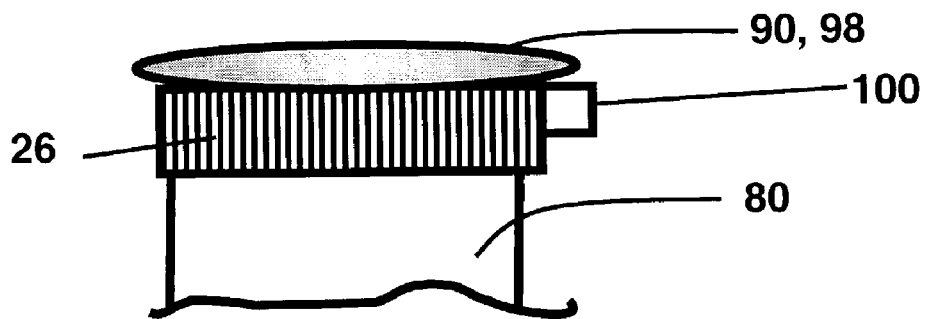
FIG. 5 is an enlarged portion of the system of FIG. 1, and incorporating a fourth embodiment of an apparatus according to the present invention.

Referring to FIG. 5, in a fourth embodiment fire shield 90 includes an inflatable bladder 98 preferably comprised of a suitable fire resistant material such as Nomex™ (a trademark of E. I. du Pont de Nemours and Company) cloth or other suitable material. Actuator 100 may include a pyrotechnic type device roughly similar to that employed in automobile airbag restraint systems.

One skilled in the art will recognize that the teachings of the present invention may be incorporated into numerous other structural configurations, as well, such as shutters, scoop or deflector, butterfly valve(s) or other valve arrangements, and many other moveable and non-moveable shielding arrangements. Accordingly, the above embodiments are intended to be illustrative only.

The present invention is presented as beneficial to passive cooling systems of the type shown generally in FIG. 1. It will be appreciated, however, that air may be provided in any number of ways to the compartment. For example, scoop 60 and outlet 50 may be absent, and instead a separate conduit (not shown) provided which independently supplies air to compartment 12 (as shown, for example, U.S. Pat. No. 6,092,360, the contents of which incorporated by reference into this disclosure), or alternately, a louver (not shown) may be provided in exterior surface 16 of the aircraft (as shown, for example, U.S. Pat. No. 5,265,408, the contents of which also incorporated by reference into this disclosure). The means by which air is supplied to compartment 12 is not important to the present invention. Furthermore, the present invention may also be beneficially applied in other types of auxiliary power unit cooling systems. The scope of the appended claims is not intended to be limited, therefore, only to the specific embodiments described herein.

I claim:

1. A fire protection apparatus for an oil cooler in an aircraft auxiliary power unit compartment, the oil cooler mounted to an exhaust eductor on an auxiliary power unit in the compartment, the oil cooler having a first side substantially facing the compartment through which air enters the oil cooler and a second side mounted to the exhaust eductor, the fire protection apparatus comprising:
    a sensor adapted for sensing a fire in the compartment; and
    a fire shield mounted adjacent the oil cooler, the fire shield being operable to at least partially cover the oil cooler in response solely to a signal received from the sensor to thereby at least partially block flames from directly impinging the oil cooler in the event of a fire in the compartment.

2. The fire protection apparatus of claim 1, wherein the fire shield comprises a plurality of fire blocking members.

3. The fire protection apparatus of claim 1, wherein the fire shield is mounted to the oil cooler.

4. The fire protection apparatus of claim 1, wherein the fire shield is mounted adjacent the first side of the oil cooler.

5. The fire protection apparatus of claim 1, wherein the fire shield is moveable between a first position, wherein the first side of the oil cooler is substantially uncovered by the fire shield, and a second position, wherein the first side of the oil cooler substantially covered by the fire shield.

6. The fire protection apparatus of claim 5, wherein the fire shield is pivotably moveable between the first and second positions.

7. The fire protection apparatus of claim 5, wherein the fire shield is slidably moveable between the first and second positions.

8. The fire protection apparatus of claim 5, wherein the fire shield is inflatably moveable between the first and second positions.

9. The fire protection apparatus of claim 5, wherein the fire shield is actively moveable between the first and second positions by an actuating member.

10. The fire protection apparatus of claim 5, wherein the fire shield is moveable between the first and second positions in response to solely to said signal indicating a fire in the compartment.

11. The fire protection apparatus of claim 1, wherein the fire shield is fixed relative to the cooler.

12. A fire protection apparatus in combination with an oil cooler of an aircraft auxiliary power unit disposed within a compartment, the combination comprising:

the oil cooler having a first upstream side and a second downstream side, the first upstream side substantially facing the compartment and through which air enters the oil cooler, the second downstream side mounted to an exhaust eductor of the aircraft auxiliary power unit and through which air exits the oil cooler;

the fire protection apparatus including shield means for substantially blocking impingement of flames on the first upstream side of the oil cooler in the event of a fire within the compartment.

13. The combination of claim 12, wherein the shield means are movable relative to the oil cooler.

14. The combination of claim 12, wherein the shield means are fixed relative to the oil cooler.

15. The combination of claim 12, wherein the shield means are mounted to the first upstream side of the oil cooler.

16. The fire protection apparatus of claim 1, wherein the fire shield substantially completely covers the first upstream side of the oil cooler.

17. An oil cooler assembly for an aircraft auxiliary power unit disposed within a compartment and having an exhaust eductor, the oil cooler assembly comprising:

an oil cooler for mounting to the exhaust eductor within the compartment, the oil cooler having a first side substantially facing the compartment and through which air enters the oil cooler and a second side for mounting to the exhaust eductor and through which air exits the oil cooler; and a fire protection apparatus for the oil cooler including a fire shield and a sensor adapted for detecting a fire in the compartment, the fire shield being mounted adjacent the first side of the oil cooler, the sensor autonomously producing a signal in response to the detection of a fire, and the fire shield at least partially covering the first side of the oil cooler in response solely to the signal received from the sensor.

18. The oil cooler assembly as defined in claim 17, wherein the fire shield is moveable from an open position to a closed position when the signal from the sensor indicates the presence of a fire in the compartment, wherein the first side of the oil cooler is substantially uncovered by the fire shield in the open position and the first side of the oil cooler substantially covered by the fire shield in the closed position.

19. The oil cooler assembly as defined in claim 18, wherein the fire shield is moveable back and forth between the open position and the closed position based on the signal from the sensor.

* * * * *